United States Patent
Jover et al.

(10) Patent No.: US 10,332,324 B2
(45) Date of Patent: Jun. 25, 2019

(54) SYSTEM, DEVICE AND METHOD FOR RECORDING DATA IN AN AIRCRAFT

(71) Applicant: AIRBUS OPERATIONS (S.A.S.), Toulouse (FR)

(72) Inventors: Sebastien Jover, Labege (FR); Jean-Philippe Corbefin, Cornebarrieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 280 days.

(21) Appl. No.: 15/207,139

(22) Filed: Jul. 11, 2016

(65) Prior Publication Data
US 2017/0018125 A1   Jan. 19, 2017

(30) Foreign Application Priority Data

Jul. 16, 2015 (FR) ..................................... 15 56703

(51) Int. Cl.
*G07C 5/08* (2006.01)
*G07C 5/02* (2006.01)
(Continued)

(52) U.S. Cl.
CPC .............. *G07C 5/085* (2013.01); *G07C 5/02* (2013.01); *G07C 5/08* (2013.01); *G07C 5/0816* (2013.01);
(Continued)

(58) Field of Classification Search
CPC . G07C 5/085; G07C 5/02; G07C 5/08; G07C 5/0816; G07C 5/0841; G07C 5/008; G07C 2205/02; H04L 67/12
See application file for complete search history.

(56) References Cited

U.S. PATENT DOCUMENTS 5,974,349 A * 10/1999 Levine ...................... B64F 5/00
701/31.4
6,915,189 B2 * 7/2005 Igloi et al. ................ B64F 5/60
701/31.4
(Continued)

FOREIGN PATENT DOCUMENTS

WO   WO 2015/048412   4/2015

OTHER PUBLICATIONS

French Search Report for Application No. 1556703 dated Mar. 17, 2016.

*Primary Examiner* — Dale W Hilgendorf
(74) *Attorney, Agent, or Firm* — Jenkins, Wilson, Taylor & Hunt, P.A.

(57) ABSTRACT

A system, device and method for recording data in an aircraft including a memory and a network interface through which it is connected to the network. This device is configured for acquiring information from the avionics communication network, and information relative to characteristic events relative to operation of the aircraft, generating indexes corresponding to different times, recording, in a first part of the memory, indexed data corresponding to the information coming from avionics communication network, the indexed data including a set of recordings, each recording corresponding to the combination of information coming from the avionics communication network and an index corresponding to a time associated with that recording; and recording, in a second part of the memory, for several of the characteristic events, information of correspondence between the characteristic event in question and an index corresponding to a time associated with that characteristic event.

9 Claims, 3 Drawing Sheets

(51) Int. Cl.
*G07C 5/00* (2006.01)
*H04L 29/08* (2006.01)

(52) U.S. Cl.
CPC .......... *G07C 5/0841* (2013.01); *G07C 5/008* (2013.01); *G07C 2205/02* (2013.01); *H04L 67/12* (2013.01)

(56) References Cited

U.S. PATENT DOCUMENTS

| | | | | |
|---|---|---|---|---|
| 2005/0017876 A1* | 1/2005 | Ziarno | ................... | G07C 5/008 701/31.4 |
| 2005/0267656 A1* | 12/2005 | Dabrowski | ............ | G07C 5/085 701/14 |
| 2013/0204487 A1* | 8/2013 | Ovens | ................... | G07C 5/0825 701/33.2 |
| 2014/0067821 A1* | 3/2014 | Sykes | ............... | G06F 17/30911 707/741 |
| 2015/0339241 A1* | 11/2015 | Warner et al. | ......... | G07C 5/008 710/74 |
| 2016/0101876 A1* | 4/2016 | Wolfe | ................... | G07C 5/008 701/31.4 |
| 2016/0292932 A1* | 10/2016 | Gremmet et al. | ..... | G07C 5/008 |

* cited by examiner

Fig. 4

SYSTEM, DEVICE AND METHOD FOR RECORDING DATA IN AN AIRCRAFT

CROSS-REFERENCE TO RELATED APPLICATION

This application claims the benefit of and priority to French patent application number 15 56706 filed on Jul. 16, 2015, the entire disclosure of which is incorporated by reference herein.

TECHNICAL FIELD

The disclosure herein relates to an onboard control system of an aircraft, to a device and to a method for recording data in an aircraft, and to an aircraft comprising such a system.

BACKGROUND

Aircraft, in particular modern transport aircraft, comprise an onboard control system comprising a plurality of computers, such as notably at least one FMS (Flight Management System) computer, at least one FCS (Flight Control System) computer, adapted for controlling the control surfaces of the aircraft, a warning management computer of the FWS (Flight Warning System) type, a cockpit display management computer of the CDS (Cockpit Display System) type, etc. These computers are generally called avionic computers and are interconnected with each other by an avionics communication system by which they communicate with each other. This avionics communication system can correspond to a communication bus assembly conforming with the ARINC 429standard or to a deterministic Ethernet communication network conforming with the ARINC 664 part 7 standard, for example an AFDX® communication network.

It is sometimes necessary to analyze, by a device outside of the aircraft, information coming from aircraft systems. This information can for example be used for maintenance purposes or for the analysis of flight test data. In order to do this, an application must be installed on an avionics computer of the aircraft, this application being configured for acquiring data produced on board the during the operation of the aircraft, converting these data into a specified format and recording them on a removable medium, such as for example a hard disk. The data acquired by the application can be produced by the avionics computer, or by another avionics computer. When the aircraft is at rest on the ground, this removable medium can be extracted from the aircraft in order for the recorded data to be used by the device outside of the aircraft. However, the amount of data recorded on the removable medium can be very high, which can sometimes necessitate a long processing time in order to retrieve the desired data. Moreover, it is necessary to install the application on one of the avionics computers.

SUMMARY

A purpose of the disclosure herein is to provide a solution to these problems. The disclosure herein relates to an onboard control system of an aircraft, this system comprising a plurality of computers interconnected with each other by an avionics communication network, and to a device for recording data comprising a memory and a network interface through which the data recording device is connected to the avionics communication network.

The system is noteworthy in that the data recording device is configured for:
- acquiring information coming from the avionics communication network, as well as information relative to characteristic events relative to the operation of the aircraft;
- generating indexes corresponding to different times;
- recording, in a first part of the memory, indexed data corresponding to the information coming from avionics communication network, the indexed data comprising a set of recordings, each recording corresponding to the combination of information coming from the avionics communication network and an index corresponding to a time associated with that recording; and
- recording, in a second part of the memory, for several of the characteristic events, information of correspondence between the characteristic event in question and an index corresponding to a time associated with that characteristic event.

Thus, thanks to this system, it is possible to find recorded data easily and quickly in order to use them on the ground: the knowledge of the characteristic event to which the sought data correspond makes it possible to retrieve, from the second part of the memory, the index associated with that characteristic event. The knowledge of that index then makes it possible to access the sought data, in the first part of the memory.

Advantageously, the data recording device comprises a second interface, separate from the network interface, configured for reading the indexed data recorded in the first part of the memory and/or correspondence information recorded in the second part of the memory, by an equipment outside of the aircraft. Thus, it is not necessary to remove the data recording device from the aircraft in order to access the recorded data: in order to do this it suffices to connect a device outside of the aircraft onto this second interface and to use it for reading data contained in the memory of the data recording device.

According to a first variant embodiment, the data recording device is configured as a subscriber to the communication network and computers of the onboard system are configured for transmitting information to the data recording device.

According to another variant, the data recording device is configured for acquiring information flowing in the communication network, between computers connected to this communication network. Thus, no particular configuration of the computers connected to the network is necessary for the recording of the data by the data recording device.

In an advantageous embodiment, the data recording device is configured for prohibiting the transmission of information from an equipment outside of the aircraft to the avionics communication network, when such an equipment outside of the aircraft is connected to the data recording device through the second interface. This makes it possible to guarantee the security of the avionics network and of the computers connected to that network.

In a particular embodiment, the data recording device is configured for encrypting the indexed data and/or the correspondence information before recording them in the memory.

In one embodiment, the data recording device comprises a self-configuration algorithm configured for adapting the recording of the indexed data as a function of the communication network. Thus, no particular configuration of the computers connected to the network, or of the data recording device, is necessary for the recording of the data by the data recording device.

The disclosure herein also relates to an aircraft comprising an onboard control system such as mentioned above.

The disclosure herein also relates to a data recording device comprising a memory and a network interface provided for connecting the data recording device to an avionics communication network through which several computers of an onboard control system of an aircraft are interconnected with each other, the data recording device being configured for, when it is connected to the avionics communication network:

acquiring information coming from the avionics communication network, as well as information relative to characteristic events relative to the operation of the aircraft;

generating indexes corresponding to different times;

recording, in a first part of the memory, indexed data corresponding to the information coming from the avionics communication network, the indexed data comprising a set of recordings, each recording corresponding to the combination of information coming from the avionics communication network and an index corresponding to a time associated with that recording; and recording, in a second part of the memory, for several of the characteristic events, information of correspondence between the characteristic event in question and an index corresponding to a time associated with that characteristic event.

The disclosure herein also relates to a method for recording data in an aircraft comprising an onboard control system, this system comprising a plurality of computers interconnected with each other through an avionics communication network, as well as a data recording device comprising a memory and a network interface through which the data recording device is connected to the avionics communication network.

The method is noteworthy in that it comprises or consists of the following steps implemented by the data recording device:

acquiring information coming from the avionics communication network, as well as information relative to characteristic events relative to the operation of the aircraft;

generating indexes corresponding to different times;

recording, in a first part of the memory, of indexed data corresponding to the information coming from the avionics communication network, the indexed data comprising a set of recordings, each recording corresponding to the combination of information coming from the avionics communication network and an index corresponding to a time associated with that recording; and recording, in a second part of the memory, for several of the characteristic events, information of correspondence between the characteristic event in question and an index corresponding to a time associated with that characteristic event.

BRIEF DESCRIPTION OF THE DRAWINGS

The disclosure herein will be better understood on reading the following description and on examination of the appended figures; wherein.

DETAILED DESCRIPTION

Figure 1:
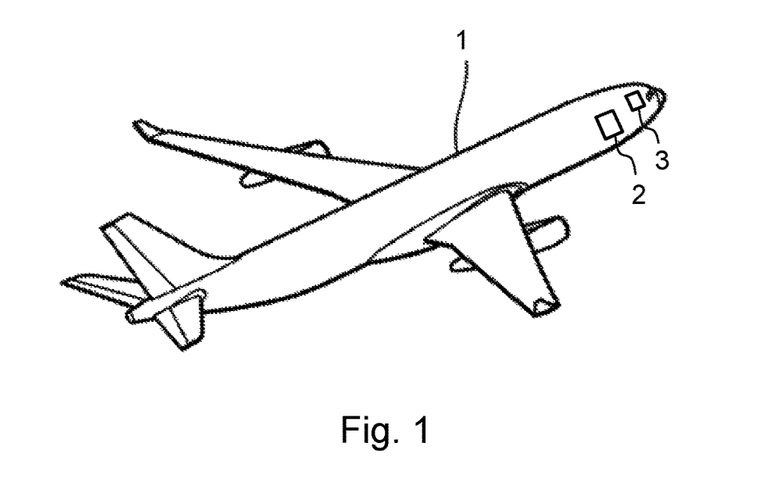
FIG. 1 is a simplified illustration of an aircraft comprising a cockpit.
Figure 2:
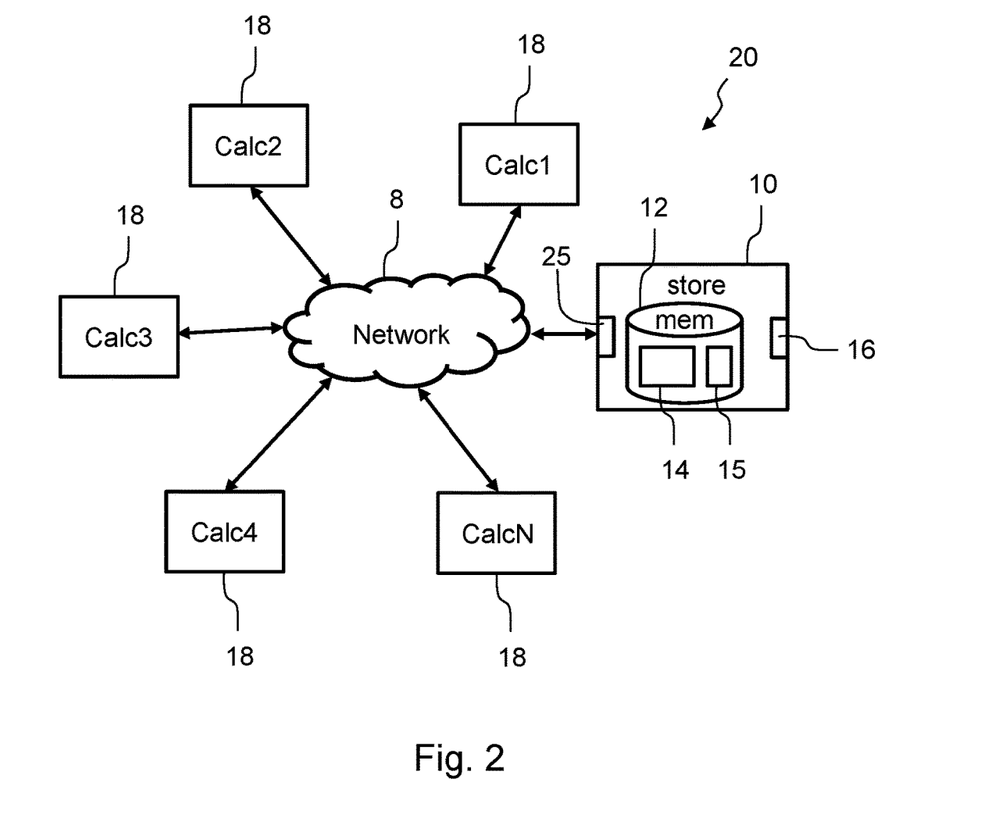
FIGS. 2 and 3 show an onboard control system comprising a data recording device, according to an embodiment of the disclosure herein.

The aircraft 1 shown in FIG. 1 comprises a cockpit 3 and an onboard control system 20 such as shown in FIG. 2. The onboard control system 20 comprises a plurality of computers 18, connected to an avionics communication network 8. These computers can for example be of the FMS, FCS, FWS, CDS, etc. type. A data recording device 10 is also connected to the avionics communication network through a network interface 25. This data recording device comprises the network interface 25, a memory 12 comprising at least a first part 14 and a second part 15. The computers 18 and the data recording device 10 can in particular be situated in an avionics bay 2 of the aircraft.

During operation, the different computers 18, interconnected with each other through the communication network 8, exchange information by the communication network. The data recording device 10 is configured for acquiring information coming from the avionics communication network 8. In order to do this, in a first embodiment, the data recording device captures information exchanged between the different computers 18 by the communication network. No setting up, either of the computers 18 or of the communication network, is therefore necessary in order for the data recording device to be able to capture this information. In order not to disturb the operation of the avionics communication network, the data recording device can be connected to that network by an optical isolator. In a second embodiment, the communication network 8 is configured in such a way as to send the information exchanged between the different computers 18 also to the data recording device 10. In the case of a communication network conforming with the ARINC 429 standard, communication buses upon which this information is transmitted are connected not only to the computers 18 in question, but also to inputs of the data recording device. In the case of a communication network of the deterministic switched Ethernet type, for example an AFDX® communication network, the network comprises switches comprising configuration tables in which virtual links are set up upon which the information between the different computers flows. These configuration tables are therefore defined in such a way that these virtual links arrive at the data recording device. In these first two embodiments, no specific configuration of the computers 18 is necessary. In a third embodiment, the data recording device 10 is configured like a normal subscriber to the communication network 8. The computers 18 in question, as well as the possible switches of the communication network 8, are then configured for transmitting information to the data recording device 10 for the purpose of recording data corresponding to this information.

The data recording device 10 is also configured for acquiring information relative to characteristic events relating to the operation of the aircraft. These characteristic events can for example correspond to flight phases of the aircraft (for example: taxiing on the ground, takeoff, climb phase, cruise flight, descent phase, landing, taxiing on the ground), to failures of systems of the aircraft, to particular flight conditions of the aircraft (for example a hard landing, turbulence, etc.), to particular conditions relative to the geographic position of the aircraft (for example passing through a geographic limit or an altitude), to a particular data flow on a communication link, to predetermined times (for example every second or every minute), etc. These items of information can notably come from one or more particular computers of the aircraft, for example a flight management FMS computer for the characteristic events corresponding to flight phases of the aircraft, a maintenance computer of the aircraft for the characteristic events corresponding to failures of systems of the aircraft, etc. Several alternatives are possible for this: according to a first alternative, the data recording device is configured for retrieving the information relative to the characteristic events among the items of information exchanged between the computers 18 on the communication network 8. These items of information relative to the characteristic events can for example correspond to information transmitted by the particular computer or computers to another computer. According to a second alternative, the communication network 8 is configured for transmitting these items of information relative to the characteristic events to the data recording device on a specific link, for example a specific bus in the case of a network conforming with the ARINC 429 standard, or a specific virtual link in the case of an AFDX® communication network. According to a third alternative, the particular computer or computers are configured for transmitting these items of information relative to the characteristic events to the data recording device by the communication network.

The data recording device 10 is configured for generating indexes corresponding to different times. This device records indexed data, corresponding to the information coming from the avionics network, in a first part 14 of the memory 12. These indexed data comprise a set of recordings, each recording corresponding to the combination of information coming from the avionics communication network and an index corresponding to a time associated with that recording. The indexed data are so called because each recording comprises an index. The data recording device 10 also records, in a second part 15 of the memory 12, for the different characteristic events, information of correspondence between the characteristic event in question and an index corresponding to a time associated with that characteristic event. Several alternatives are possible for the generation of the indexes by the data recording device: according to a first alternative, each index corresponds to a number, successive numbers (which can be consecutive or non-consecutive) being generated for successive times. For example, for a first time, the device 10 generates an index equal to 1, for a second time it generates an index equal to 2, for a third time it generates an index equal to 3, etc. In a particular way, these numbers can be produced by a counter incremented according to a predetermined period: successive numbers for successive times are generally not therefore consecutive insofar as the successive times are then generally asynchronous with respect to the incrementing period of the counter. According to a second alternative, the indexes generated by the device 10 correspond to a time stamp: an index generated for a time t is then a number or a set of numbers representing that time t (for example year, month, day, hour, minute, second and possibly milliseconds). As mentioned above, each recording recorded in the first part 14 of the memory 12 corresponds to the combination of information coming from the avionics communication network and an index (generated by the data recording device 10) corresponding to a time associated with that recording. Several alternatives are possible with regard to the time associated with a recording. According to a first alternative, this time corresponds to the time at which the data recording device 10 records that recording in the first part 14 of the memory 12. According to a second alternative, this time corresponds to the time at which the information corresponding to that recording was acquired from the avionics communication network by the data recording device 10. According to another alternative, in the particular case where the items of information acquired from the avionics communication network are time stamped, this time corresponds to the time stamping of the items of information. According to one embodiment, the information recorded in each recording of the first zone of the memory corresponds directly to the information coming from the avionics communication network 8, acquired by the data recording device 10, without modification of the format of the information. This makes it possible to subsequently carry out, outside of the aircraft, a processing of the recorded data, in the same way as if it were a processing, on board the aircraft, of information flowing on the avionics communication network 8. In another embodiment, the information coming from the avionics communication network 8 acquired by the data recording device 10 is processed by the data recording device 10 in such a way as to put it into a specified format. The recorded information then corresponds to the information thus processed by the data recording device 10. This embodiment can make it possible to record all of the data in the same format, whatever the nature of the information and/or the computers having sent this information on the avionics network may be. In a particular embodiment, the data can be encrypted in such a way as to guarantee the confidentiality of the data recorded in the memory 12.

In a particular embodiment, the data recording device comprises a self-configuration algorithm configured for adapting the recording of the indexed data as a function of the communication network. For example, the recording of the data can be adapted as a function of the computer having sent the corresponding information on the communication network. In particular, the first part 14 of the memory can be subdivided into several sub-parts, each sub-part being used for recording data corresponding to information coming from a particular computer. In the case where a new computer is connected to the communication network, the data recording device 10 is then capable of recognizing information transmitted on the communication network by that new computer. It then records data corresponding to that information in a new sub-part (associated with that new computer) of the first part 14 of the memory.

In one embodiment, the memory 12 of the data recording device 10 corresponds to a hard disk or to a non-volatile memory, for example a "Flash" memory such at that usually used in static disks of the SSD (Solid State Device) type or in memory cards. The first part 14 of the memory 12 corresponds to at least a first file recorded on this disk or in this non-volatile memory and the second part 15 of the memory corresponds to at least a second file recorded on this disk or in this non-volatile memory.

Figure 3:
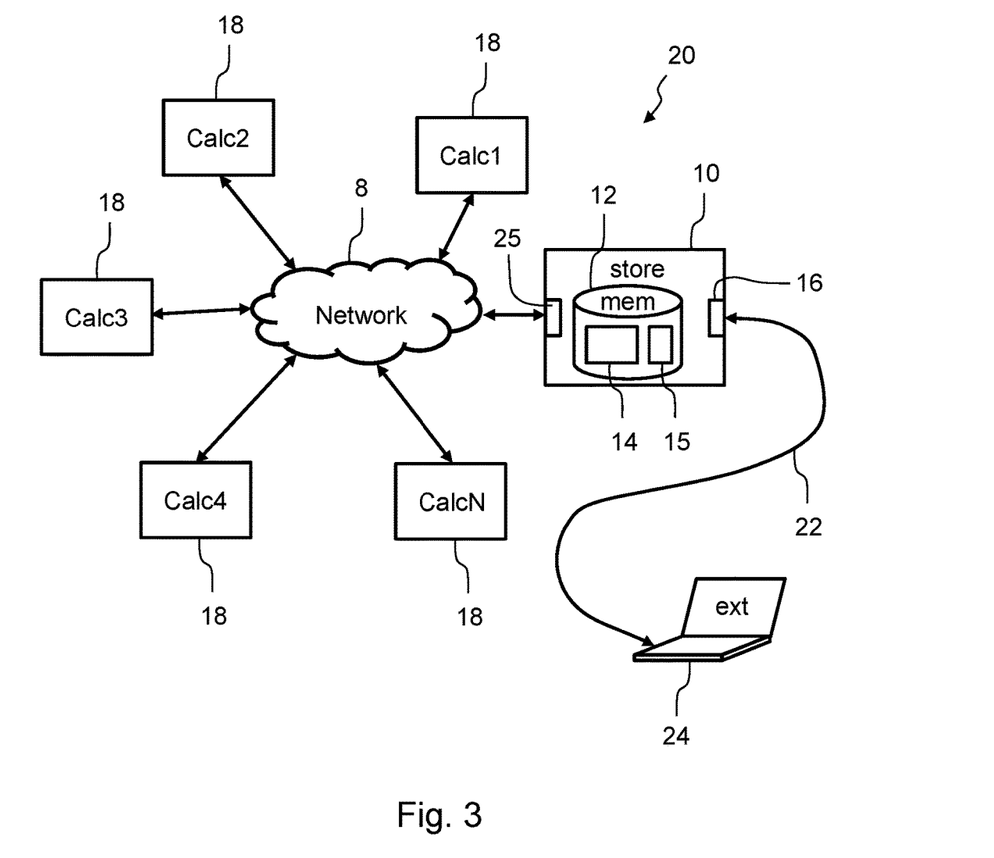
Figure 4:
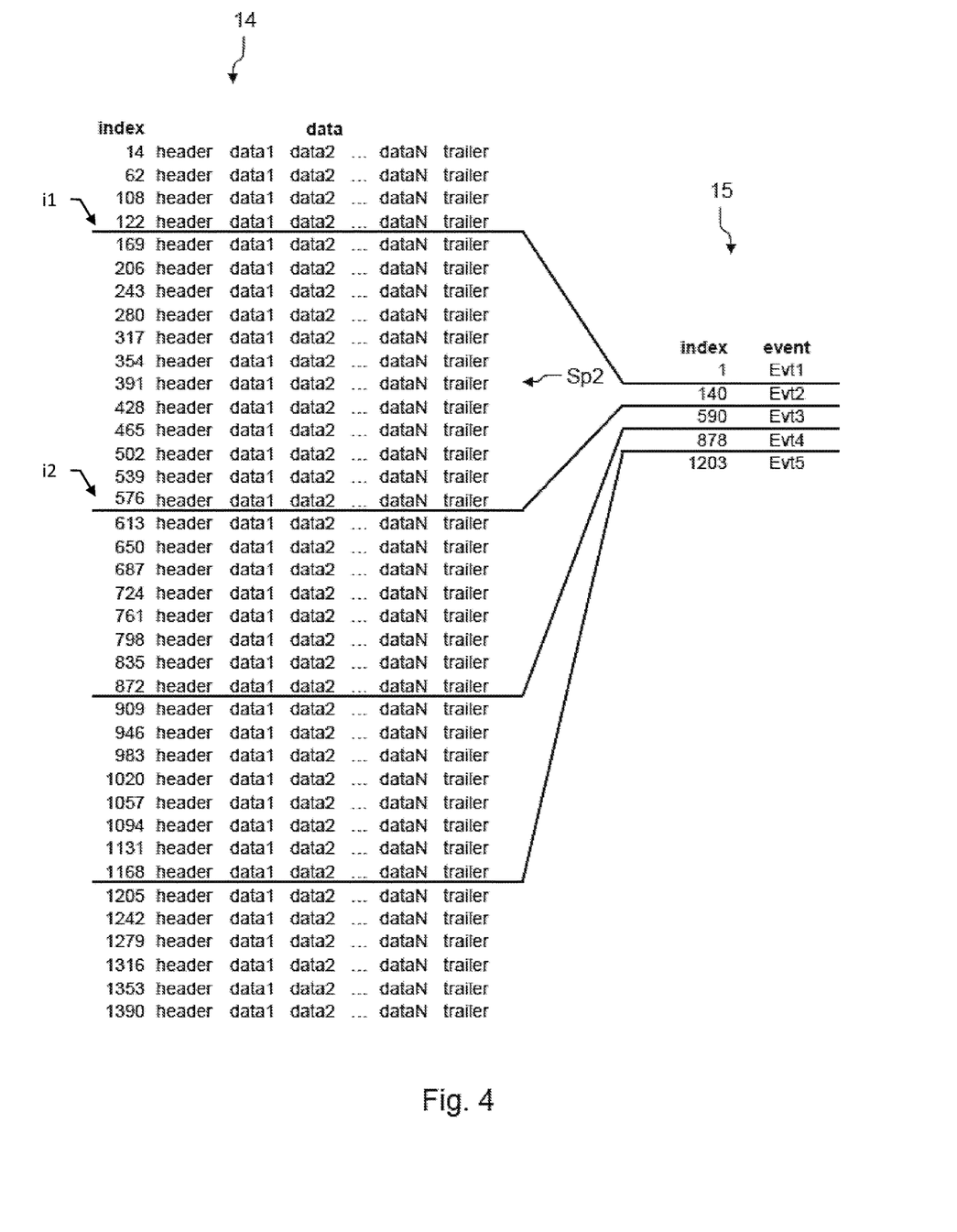
FIG. 4 shows an example of data recording in a data recording device according to an embodiment of the disclosure herein.

The data recording device 10 comprises a second interface 16, separate from the network interface 25. The second interface 16 is configured to make it possible to allow the reading of indexed data and/or correspondence information by equipment outside of the aircraft. Thus, it is not necessary to remove the data recording device from the aircraft in order to access the recorded data: as shown in FIG. 3, it suffices for this purpose to connect a device 24 outside of the aircraft onto this second interface, by a link 22, and to use this outside device for reading data contained in the memory of the data recording device. The second interface 16 is preferably of a standardized type usually used in the data processing field, such as for example an interface conforming with a standard of the USB or Wifi type, which facilitates the connection of the outside equipment to this interface. The data recording device is therefore similar, for the outside equipment, to a removable hard disk or to a USB stick. The outside equipment can notably correspond to a portable computer, a tablet, etc. An operator who wishes to retrieve data recorded in the data recording device 10 generally knows which characteristic event the data the operator wishes to retrieve relate to. The operator can then use the outside equipment 24 for reading data in the second part 15 of the memory 12, in such a way as to retrieve, from the correspondence information, an index i1 corresponding to the characteristic event in question. The knowledge of the index then makes it possible to access directly, in the first part 14 of the memory 12, the data recorded for the characteristic event in question. More particularly, this index makes it possible to access the first data recorded for the characteristic event in question. If the second part 15 of the memory 12 also contains information relative to a characteristic event later than the characteristic event in question, it is also possible to read, in the correspondence information, a second index i2 corresponding to a characteristic event following the characteristic event in question. This second index makes it possible to access, in the first part 14 of the memory 12, the first items of data recorded for the characteristic event following the characteristic event in question. This makes it possible to delimit a sub part of the first part 14 of the memory 12, in which are recorded the data corresponding to the characteristic event in question. The reading of the indexes i1 and i2 in the second part of the memory therefore makes it possible to determine quickly the sub-part of the first part 14 of the memory 12 in which the sought data are recorded. It is not therefore necessary to read all of the data recorded in the first part 14 of the memory 12. In the example shown in FIG. 4, it is assumed that an operator wishes to retrieve data relative to a characteristic event "Evt2" corresponding for example to a takeoff phase of the aircraft. The data recorded in the first part 14 of the memory correspond to a set of recordings each one corresponding to one row of the figure, each recording comprising an index, a data header (header), a set of data (data1, data2, . . . dataN) and an end of recording indicator (trailer). The indexes shown in the figure correspond to numbers. These numbers were produced by a counter, as described above, and consequently the index numbers of consecutive recordings are not necessarily consecutive. The correspondence information recorded in the second part 15 of the memory corresponds to a set of rows each corresponding to a characteristic event. Each row contains an index number corresponding to a start time of the characteristic event in question (1, 140, 590, 878, 1203), and an identifier of the characteristic event (Evt1, Evt2, . . . Evt5). In order to retrieve the data corresponding to the characteristic event "Evt2", the operator searches for "Evt2" in the correspondence information recorded in the second part of the memory and the operator identifies the corresponding index 140. As this index 140 is included between the successive indexes 122 and 169 of the rows of the first part 14 of the memory, the result of this is that the recorded data corresponding to the characteristic event "Evt2" begin in the row of index 169. In the second part of the memory, the row consecutive to the row relative to the characteristic event "Evt2" corresponds to the characteristic event "Evt3" for which the index is 590. As this index 590 is included between the successive indexes 576 and 613 of the rows of the first part 14 of the memory, the result of this is that the recorded data corresponding to the characteristic event "Evt3" begin in the row of index 613 and the recorded data corresponding to the characteristic event "Evt2" end in the row of index 576. Consequently, the data corresponding to the characteristic event "Evt2" are recorded in a sub part sp2 of the first part 14 of the memory, corresponding to the rows whose indexes are included between 169 and 576 inclusive. The abovementioned operations can be carried out by the operator. However, in a preferred manner, they are implemented by a software application installed in the external equipment 24: the operator then indicates to this application the nature of the data the operator wishes to retrieve (for example the identifier of the characteristic event corresponding to the data the operator wishes to retrieve) and the software application then automatically retrieves that data from the data recording device 10.

In an advantageous embodiment, the data recording device 10 is configured in order not to send information on the communication network 8. For example, it can be connected to the communication network 8 by an optical isolator. This makes it possible to guarantee the security of the avionics communication network when an external equipment 24 is connected to the data recording device 10 by the link 22.

The disclosure herein is also advantageous in the case where a software application installed in a computer connected to the avionics communication network must record information during the operation of the aircraft. This application can for example be a maintenance application installed in a maintenance computer of the aircraft, for which it may be necessary to record information relative to failures occurring during the operation of the aircraft. Thanks to the disclosure herein, rather than having to make requests for recording these items of information, the application can simply send that information over the avionics communication network and the data recording device 10 then automatically records that information. This simplifies the management of the recording of information by the application. Moreover, it is not necessary to provide a specific device for recording the information.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An onboard control system of an aircraft, the system comprising a plurality of computers interconnected with each other by an avionics communication network, and a device for recording data comprising a memory and a network interface through which the data recording device is connected to the avionics communication network, wherein the data recording device is configured for:
   acquiring information coming from the avionics communication network, as well as information relative to characteristic events relative to operation of the aircraft;
   generating indexes corresponding to different times;
   recording, in a first part of the memory, indexed data corresponding to the information coming from avionics communication network, the indexed data comprising a set of recordings, each recording corresponding to a combination of information coming from the avionics communication network and a first index corresponding to a time associated with that recording;
   recording, in a second part of the memory, for several of the characteristic events, information of correspondence between a characteristic event in question and a second index corresponding to a time associated with that characteristic event; and
   executing, at the data recording device, a self-configuration algorithm;
   wherein the data recording device comprises a second interface, separate from the network interface, configured for connecting to an equipment outside of the aircraft that is configured for reading a portion of the indexed data recorded in the first part of the memory by first accessing the second part of the memory to look up a particular second index for a particular characteristic event and using the particular second index to find the portion of the indexed data recorded in the first part of the memory; and
   wherein the data recording device comprises the self-configuration algorithm configured for adapting the recording of the indexed data as a function of the communication network, and wherein adapting the recording of the indexed data as the function of the communication network comprises adapting the recording as a function of a particular computer having sent the corresponding information on the communication network.

2. The system as claimed in claim 1, wherein the data recording device is configured as a subscriber to the communication network and computers of the onboard control system are configured for transmitting information to the data recording device.

3. The system as claimed in claim 1, wherein the data recording device is configured for acquiring information flowing in the communication network, between computers connected to this communication network.

4. The system as claimed in claim 1, wherein the data recording device is configured for prohibiting transmission of information from the equipment outside of the aircraft to the avionics communication network, when the equipment outside of the aircraft is connected to the data recording device through the second interface.

5. The system as claimed in claim 1, wherein the data recording device is configured for encrypting the indexed data and/or the correspondence information before recording them in the memory.

6. The system as claimed in claim 1, wherein the first part of the memory is subdivided into a plurality of sub-parts, each sub-part being used for recording data corresponding to information coming from the particular computer.

7. A first aircraft comprising the onboard control system as claimed in claim 1.

8. A data recording device comprising a memory and a network interface provided for connecting the data recording device to an avionics communication network through which several computers of an onboard control system of an aircraft are interconnected with each other, wherein the data recording device, when connected to the avionics communication network, is configured for:
   acquiring information coming from the avionics communication network, as well as information relative to characteristic events relative to operation of the aircraft;
   generating indexes corresponding to different times;
   recording, in a first part of the memory, indexed data corresponding to information coming from the avionics communication network, the indexed data comprising a set of recordings, each recording corresponding to a combination of information coming from the avionics communication network and a first index corresponding to a time associated with that recording;
   recording, in a second part of the memory, for several of the characteristic events, information of correspondence between a characteristic event in question and a second index corresponding to a time associated with that characteristic event; and
   executing, at the data recording device, a self-configuration algorithm;
   wherein the data recording device comprises a second interface, separate from the network interface, configured for connecting to an equipment outside of the aircraft that is configured for reading a portion of the indexed data recorded in the first part of the memory by first accessing the second part of the memory to look up a particular second index for a particular characteristic event and using the particular second index to find the portion of the indexed data recorded in the first part of the memory; and
   wherein the data recording device comprises the self-configuration algorithm configured for adapting the recording of the indexed data as a function of the communication network, and wherein adapting the recording of the indexed data as the function of the communication network comprises adapting the recording as a function of a particular computer having sent the corresponding information on the communication network.

9. A method for recording data in an aircraft comprising an onboard control system, the system comprising a plurality of computers interconnected with each other through an avionics communication network, as well as a data recording device comprising a memory, a self-configuration algorithm, and a network interface through which the data recording device is connected to the avionics communication network, wherein the method comprises the following steps implemented by the data recording device:

acquiring information coming from the avionics communication network, as well as information relative to characteristic events relative to operation of the aircraft;

generating indexes corresponding to different times;

recording, in a first part of the memory, of indexed data corresponding to information coming from the avionics communication network, the indexed data comprising a set of recordings, each recording corresponding to a combination of information coming from the avionics communication network and an index corresponding to a time associated with that recording;

recording, in a second part of the memory, for several of the characteristic events, information of correspondence between a characteristic event in question and an index corresponding to a time associated with that characteristic event;

executing, at the data recording device, the self-configuration algorithm, wherein the self-configuration algorithm is configured for adapting the recording of the indexed data as a function of the communication network, and wherein adapting the recording of the indexed data as the function of the communication network comprises adapting the recording as a function of a particular computer having sent the corresponding information on the communication network; and connecting, using a second interface separate from the network interface, to an equipment outside of the aircraft that is configured for reading a portion of the indexed data recorded in the first part of the memory by first accessing the second part of the memory to look up a particular second index for a particular characteristic event and using the particular second index to find the portion of the indexed data recorded in the first part of the memory.

* * * * *